United States Patent [19]
Goland et al.

[11] Patent Number: 5,860,284
[45] Date of Patent: *Jan. 19, 1999

[54] THERMALLY REGENERATED DESICCANT AIR CONDITIONER WITH INDIRECT EVAPORATIVE COOLER

[75] Inventors: Spencer K. Goland, Baton Rouge, La.; William A. Belding, Danville, Calif.

[73] Assignee: Novel Aire Technologies, L.L.C., Baton Rouge, La.

[*] Notice: The term of this patent shall not extend beyond the expiration date of Pat. No. 5,660,048.

[21] Appl. No.: 871,703

[22] Filed: Jun. 9, 1997

Related U.S. Application Data

[60] Provisional application No. 60/022,184 Jul. 19, 1996.
[51] Int. Cl.[6] .................................................. F25D 17/06
[52] U.S. Cl. ............................... 62/94; 62/304; 62/314; 62/309; 165/60
[58] Field of Search .................................. 62/92, 93, 94, 62/271, 304, 309, 305, 314; 165/60; 55/267, 268; 95/288, 289; 96/125, 153, 127

[56] References Cited

U.S. PATENT DOCUMENTS

| | | | |
|---|---|---|---|
| 2,075,036 | 3/1937 | Hollis | 183/4 |
| 2,147,248 | 2/1939 | Fleisher | 62/176 |
| 2,233,189 | 2/1941 | Altenkirch | 62/139 |
| 2,266,219 | 12/1941 | Larriva | 62/139 |
| 2,344,384 | 3/1944 | Altenkirch | 1183/4.7 |
| 2,790,505 | 4/1957 | Dow | 183/4.3 |
| 2,792,071 | 5/1957 | Pennington | 183/2 |
| 2,925,880 | 2/1960 | Munters | 183/4.6 |
| 3,009,540 | 11/1961 | Munters | 183/114.2 |
| 3,024,867 | 3/1962 | Milton | 95/124 |
| 3,176,444 | 4/1965 | Kiyonaga | 55/26 |
| 3,176,446 | 4/1965 | Siggelin | 55/189 |
| 3,230,689 | 1/1966 | Hussmann | 55/28 |
| 3,247,679 | 4/1966 | Meckler | 62/271 |
| 3,251,402 | 5/1966 | Glav | 165/7 |
| 3,266,973 | 8/1966 | Crowley | 162/164 |
| 3,274,751 | 9/1966 | Skarstrom | 55/33 |
| 3,293,192 | 12/1966 | Maher et al. | 252/430 |
| 3,323,288 | 6/1967 | Cheung et al. | 55/58 |
| 3,338,034 | 8/1967 | Hemstreet | 55/269 X |
| 3,382,141 | 5/1968 | Arledter et al. | 162/181.6 X |
| 3,402,996 | 9/1968 | Maher et al. | 23/112 |
| 3,405,507 | 10/1968 | Spencer et al. | 55/62 |
| 3,464,186 | 9/1969 | Hankison et al. | 55/163 |
| 3,488,971 | 1/1970 | Meckler | 62/3 |
| 3,531,916 | 10/1970 | Kulperger et al. | 55/33 |
| 3,555,787 | 1/1971 | Lustig | 55/179 |
| 3,664,095 | 5/1972 | Asker et al. | 55/387 |
| 3,694,202 | 9/1972 | Sawyer, Jr. et al. | 162/181.6 X |
| 3,713,281 | 1/1973 | Asker et al. | 55/387 |
| 3,800,515 | 4/1974 | Asker et al. | 162/181.6 X |
| 3,807,149 | 4/1974 | Norback | 96/125 X |
| 3,844,737 | 10/1974 | Macriss et al. | 96/125 X |
| 3,889,742 | 6/1975 | Rush et al. | 165/7 |
| 4,002,040 | 1/1977 | Munters et al. | 62/314 |
| 4,012,206 | 3/1977 | Macriss et al. | 95/113 |

(List continued on next page.)

FOREIGN PATENT DOCUMENTS

| | | | |
|---|---|---|---|
| 3902977 | 8/1989 | Germany | 96/125 |
| 51-029388 | 3/1976 | Japan | 96/153 |
| 56-030595 | 3/1981 | Japan . | |
| 05200224 | 8/1993 | Japan | 96/153 |

OTHER PUBLICATIONS

GRI Report—Development of Desiccant Materials for Cooling System Applications Phase 1, W. A. Belding et al.
GRI Report—Advanced Desiccant Materials Assessment, R.K. Collier et al.

Primary Examiner—John M. Sollecito
Attorney, Agent, or Firm—Andrew Alexander

[57] ABSTRACT

A method of cooling a first stream of air in an air conditioning system. The first stream of air is dehumidified and cooled in first and second indirect evaporative coolers for purposes of conditioning a second stream of air for introducing to a conditioned space.

17 Claims, 7 Drawing Sheets

U.S. PATENT DOCUMENTS

| | | | |
|---|---|---|---|
| 4,064,304 | 12/1977 | Fujita et al. | 162/181.6 X |
| 4,093,435 | 6/1978 | Marron et al. | 55/269 X |
| 4,113,004 | 9/1978 | Rush et al. | 165/3 |
| 4,121,432 | 10/1978 | Weil et al. | 62/79 |
| 4,134,743 | 1/1979 | Macriss et al. | 95/113 |
| 4,172,164 | 10/1979 | Meyer et al. | 428/72 |
| 4,255,171 | 3/1981 | Dravnieks | 55/269 X |
| 4,259,092 | 3/1981 | Matsuo et al. | 96/125 X |
| 4,289,513 | 9/1981 | Brownhill et al. | 55/387 |
| 4,370,249 | 1/1983 | Bird et al. | 252/607 X |
| 4,398,927 | 8/1983 | Asher et al. | 55/34 |
| 4,504,290 | 3/1985 | Pontius | 96/153 |
| 4,594,855 | 6/1986 | Gunther | 62/92 |
| 4,668,249 | 5/1987 | Purdue | 55/33 |
| 4,701,431 | 10/1987 | Pine | 502/73 |
| 4,719,761 | 1/1988 | Cromer | 62/94 |
| 4,723,417 | 2/1988 | Meckler | 62/271 |
| 4,729,774 | 3/1988 | Cohen et al. | 55/181 |
| 4,729,853 | 3/1988 | von Bonin | 252/607 X |
| 4,749,388 | 6/1988 | Francois | 55/221 |
| 4,769,053 | 9/1988 | Fischer, Jr. | 96/125 |
| 4,871,607 | 10/1989 | Kuma et al. | 428/186 |
| 4,875,520 | 10/1989 | Steele et al. | 165/10 |
| 4,886,769 | 12/1989 | Kuma et al. | 502/62 |
| 4,911,775 | 3/1990 | Kuma et al. | 156/208 |
| 4,946,479 | 8/1990 | Izumo | 96/123 |
| 4,959,970 | 10/1990 | Meckler | 62/176.1 |
| 4,977,753 | 12/1990 | Maisotsenko et al. | 62/121 |
| 5,017,268 | 5/1991 | Clitherow et al. | 162/181.6 X |
| 5,050,391 | 9/1991 | Tsimerman | 62/94 |
| 5,052,188 | 10/1991 | Komarneni et al. | 62/94 |
| 5,126,076 | 6/1992 | Graf et al. | 252/607 X |
| 5,130,184 | 7/1992 | Ellis | 252/607 X |
| 5,167,679 | 12/1992 | Maekawa et al. | 96/125 |
| 5,170,633 | 12/1992 | Kaplan | 62/94 |
| 5,187,946 | 2/1993 | Rotenberg et al. | 62/314 |
| 5,194,414 | 3/1993 | Kuma | 96/153 X |
| 5,225,236 | 7/1993 | Keusch et al. | 428/920 X |
| 5,230,955 | 7/1993 | Diroll et al. | 428/920 X |
| 5,238,052 | 8/1993 | Chagnot | 165/8 |
| 5,242,473 | 9/1993 | Ogasahara | 96/125 |
| 5,250,350 | 10/1993 | Tung | 428/920 X |
| 5,256,476 | 10/1993 | Tanaka et al. | 428/241 |
| 5,300,138 | 4/1994 | Fischer et al. | 96/125 |
| 5,304,419 | 4/1994 | Shores | 428/355 |
| 5,308,703 | 5/1994 | Tsujimoto et al. | 96/153 X |
| 5,374,335 | 12/1994 | Lindgren et al. | 162/181.6 X |
| 5,401,706 | 3/1995 | Fischer | 96/125 X |
| 5,660,048 | 8/1997 | Belding et al. | 62/271 |

THERMALLY REGENERATED DESICCANT AIR CONDITIONER WITH INDIRECT EVAPORATIVE COOLER

CROSS REFERENCE TO RELATED APPLICATION

This application claims the benefit of U.S. Provisional Application No. 60/022,184, filed July 19, 1996.

BACKGROUND OF THE INVENTION

This invention relates to an improved method and apparatus for conditioning air such as warm moisture-laden air and more particularly, it relates to a novel system with improved efficiency for moisture removal and for evaporative cooling.

Current air conditioning technology is based on compression and expansion of a gas such as chlorinated fluorocarbon or halogenated chloroflurocarbon or ammonia. The gas is compressed to a liquid state and then allowed to expand back to a vapor state. In the expansion stage of the process, heat is required to change the liquid back to a gas. However, this system has the disadvantage that the chlorinated fluorocarbons and the halogenated chlorofluorocarbons have been found to be environmentally damaging particularly to the earth's ozone layer. In ammonia systems, the ammonia results in health and safety problems when leaks develop in the system.

Vapor compression systems have another disadvantage in that they require electricity to drive compressors. At peak demand periods, the electricity required by air conditioning systems has resulted in brownouts. Thus, there is a great need for an air conditioning system that would greatly reduce the electricity demand.

Evaporative cooling technology provides an alternative to vapor compression technology. In direct evaporative cooling, water is evaporated into the air stream entering the space to be cooled. The evaporation of the water reduces the air temperature. In an indirect evaporative cooling system, the primary air stream is cooled in a dry duct. An air stream is directed into an adjacent wet duct having a common wall with the dry duct. In the wet duct, water is evaporated into the air cooling the common wall and consequently the air in the dry duct. The evaporative cooling systems have the problem that they cannot be used in hot humid climates.

Desiccant cooling technology has been used for air conditioning wherein a desiccant material is used to remove water from air to provide a dry air stream. The dry air is then cooled as closely as practical to ambient and then water is evaporated by and into the air stream to provide cooler air. This technique works well in theory; however, in practice, it has not been used very much. Desiccant cooling has the problem that it usually requires one or more heat wheels to provide an efficient system and requires hydrocarbon as the fuel source to operate. Heat wheels are subject to leakage. In addition, heat wheels add complexity, size, weight and cost to the cooling system. Another problem with desiccant systems is the addition of heat to the air that has to be cooled.

Several attempts have been made to solve the above problems but usually with only limited success. For example, Tsimerman U.S. Pat. No. 5,050,391 discloses an apparatus and method for treating a gas in which a main gas stream is cooled and heat is transferred by convection to a liquid and a secondary gas stream across a heat transfer surface. Liquid bearing the heat evaporates into the secondary stream. A total gas stream is subjected to initial cooling along a moisture impervious surface of a heat exchange element to cause dry or sensible cooling. A secondary gas stream is diverted from the total discharge from the dry cooling stage and is directed counterflow to the total stream at the opposite surface of the heat exchange element which is an absorbent surface to cause heating and humidification of the secondary stream. The remaining cooled stream which is the primary stream is subjected to sorbent treatment to heat and dehumidify the same by flowing it through an absorbent media. The primary gas flow is then subjected to a final heat exchange treatment stage similar to the initial heat exchange treatment. Condensate may be removed from the saturated or near-saturated secondary flow. The primary flow may also be subjected to intermediate cooling treatment. A portion of the initial and final dry cooling stages preferably include an adiabatic cooling zone. The secondary flow from the initial heat exchanger may be subdivided into two streams. One secondary sub-stream is dehumidified in the sorption device by an auxiliary heater and is used for regeneration of the absorbent media. However, this system discloses the use of a complicated adsorbent belt or plate and tubular heat transfer elements and therefore does not lend itself to easy commercialization.

Gunther U.S. Pat. No. 4,594,855 discloses a process and apparatus for ventilation with heat exchange wherein outdoors and indoors air streams are induced to travel in opposite directions through the adjacent passages of a plate-fin heat exchanger. A water stream is simultaneously induced to circulate through the passages occupied by the cooler of the air streams. Heat is transferred across adjacent passages, causing vaporization of a portion of the water stream into its accompanying air stream, thus keeping the cooler stream saturated with water vapor. The hotter air stream is cooled and dehumidified while the cooler one increases in temperature and humidity content.

Maisotsenko et al U.S. Pat. No. 4,977,753 discloses a method for indirect evaporative air cooling wherein the main air stream in a room is cooled by passing it along the dry duct and simultaneously passing an auxiliary air stream that has been taken from the atmosphere in a countercurrent flow along the moist duct, which is in heat-exchange interaction with the dry duct. To provide more intensified cooling, the auxiliary stream is precooled in another dry duct, which is in heat-exchange interaction with another moist duct.

Rotenberg et al U.S. Pat. No. 5,187,946 discloses an apparatus and method for indirect evaporative cooling of a fluid which includes an apparatus and method for indirect cooling of air from its ambient temperature to substantially its dew point. Ambient air is redirected through spaced openings formed along the heat exchanger plates to form a secondary air stream.

In the following patents, desiccants or adsorbents are used in conditioning air and, in particular, for lowering the humidity of the air: U.S. Pat. Nos. 2,147,248; 2,233,189; 2,266,219; 2,344,384; 3,251,402; 3,889,742; 4,113,004; 4,121,432; 4,719,761; 4,723,417; and 4,729,774.

Kaplan U.S. Pat. No. 5,170,633 describes a method and apparatus for conditioning air utilizing a desiccant based air conditioning system requiring substantially less regeneration energy than typical systems. This regeneration energy reduction is accomplished through the use of two separate desiccant devices and an indirect evaporative cooler having both a wet and dry side for air flow-through. In the first desiccant device regeneration air is first passed through the wet side of the indirect evaporative cooler wherein it is humidified and heated. This air is then dehumidified by passing it through the second desiccant device which is operated at a high moisture content. This results in a substantial amount of moisture being adsorbed from the first regeneration air stream causing a substantial air temperature increase and thereby, reducing the auxiliary heat required. The second desiccant device may be regenerated with ambient air.

Meckler U.S. Pat. No. 3,488,971 discloses air for comfort conditioning which is circulated through a chemical dehumidifier and then is forwarded to a space to be conditioned. Optional sensible cooling coils before and after chemical dehumidification are provided. Most of the lighting heat and most of the space load are transferred to relatively high temperature water, and from the water to the chemical dehumidifier for regeneration of the desiccant therein. A thermally activated heat pump, which can be of the thermoelectric type, is used to transfer heat to the high temperature water.

In spite of these disclosures, there is still a great need for a compact, economical air conditioning unit that functions in warm, moisture-laden air, e.g., outdoor air, or in warm dry air and which does not require large amounts of electricity in order to function. The present invention provides such an air conditioning system utilizing a novel combination of desiccant systems and evaporative cooling systems.

SUMMARY OF THE INVENTION

It is an object of this invention to provide an improved air conditioning system.

It is another object of this invention to provide an improved method for conditioning hot, moisture-laden air.

It is still another object of this invention to provide an improved air conditioning system comprised of a novel combination of desiccant and indirect evaporative cooling systems.

Still, it is another object of this invention to provide in an air conditioning system utilizing indirect evaporative cooling and/or direct evaporative cooling, a novel desiccant body, such as a desiccant wheel, comprising X- or Y-type zeolite, silica, alumina or blends thereof having a modified isothermal behavior.

Yet, it is another object of this invention to provide, in an air conditioning system utilizing two-step indirect evaporative cooling, a novel desiccant wheel comprised of an X-type or Y-type zeolite having a modified isothermal behavior to yield a water adsorption isotherm having a Type-1M isotherm with a separation factor in the range of 0.03 to 0.2.

And yet, it is another object of this invention to provide an improved air conditioning system comprising a novel desiccant wheel, two-step indirect evaporative cooling systems employing one or two dry cooling steps to produce a primary, cooled dry stream of air wherein at least in one of the steps a portion of the cooled, dry air is returned to flow countercurrent to the primary, cooled dry air stream in a wet duct to further cool said primary dry stream of air.

These and other objects will become apparent from the specification, claims and drawings appended hereto.

In accordance with these objects, there is provided a method of cooling a first stream of air in an air conditioning system. The first stream of air is dehumidified and cooled in first and second indirect evaporative coolers for purposes of conditioning a second stream of air for introducing to a conditioned space. The method comprises the steps of providing an adsorption wheel having an adsorbent contained in a paper web and having a multiplicity of passages through which the first stream of air can flow for adsorbing moisture therefrom, the wheel capable of adsorption of moisture from the first stream of air and of regeneration. The first stream of air is passed through the adsorption wheel to remove moisture therefrom and then the wheel is regenerated by passing hot gases therethrough to remove moisture. A first indirect evaporative cooler and a second indirect evaporative cooler are provided having dry channels and wet channels separated by moisture-impervious walls wherein heat is extracted from the dry channels to the wet channels through the walls Air which has passed through the adsorption wheel is introduced to the dry channels of the first indirect evaporative cooler to provide a cooled stream of air. A portion of the cooled stream of air from the dry channels is diverted into the wet channels of the first indirect evaporative cooler. A second portion of the cooled stream of air exiting the dry channels of the first indirect evaporative cooler is directed to the wet channels of the second indirect evaporative cooler for purposes of cooling the dry channels of the second indirect evaporative cooler, and a second stream of air is circulated to the dry channels of the second indirect evaporative cooler for providing conditioned air for introducing to the conditioned space.

DETAILED DESCRIPTION OF THE PREFERRED EMBODIMENTS

Figure 1:
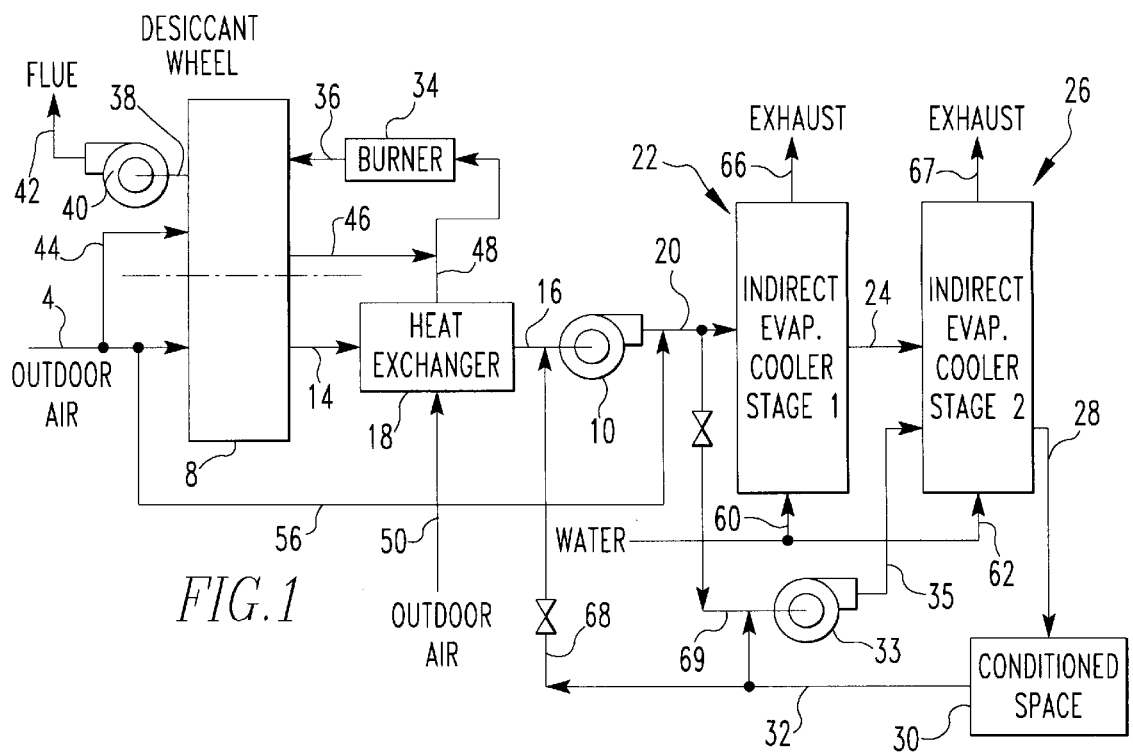
FIG. 1 is a flow diagram showing air flow steps as air is conditioned in accordance with the present invention.

Referring now to FIG. 1, there is shown a flow diagram illustrating the steps in dehumidifying and cooling a stream of air in the air conditioning system in accordance with the present invention. In FIG. 1, an ambient or outdoor air stream is first passed through an air filter to remove material such as dust particles and bugs, for example, before being passed along lines 4 to desiccant wheel 8. An air mover means such as fan 10 may be employed to draw or force the air stream through the air conditioning system. Fan 10 may be powered by an electric motor. As air, such as moisture-laden air, is passed through desiccant wheel 8, moisture is removed from the air stream to provide a moisture-depleted stream which passes along line 14, through heat exchanger 18, along line 16 and through fan 10. All or a portion of the moisture-depleted stream of air can be passed through heat exchanger 18. As air passes through desiccant wheel 8, the air becomes heated by virtue of heat of absorption of the moisture on the desiccant. Also, the air becomes heated as a result of desiccant wheel 8 being heated for regenerative or desiccant drying purposes. Thus, the air leaving desiccant wheel 8 along line 14 has a much higher temperature, e.g., 175° F. in certain sections, than the outdoor ambient air.

Moisture can be removed from the air in desiccant wheel 8 from levels of 0.01364 pounds of water per pound of air to levels of 0.0054 pounds or lower of water per pound of air, for example. This low level of water can be maintained through the air conditioning system and water added, if needed, as a last step.

In the present invention, fan 10 is shown located after heat exchanger 18. In this schematic, fan 10 draws air through desiccant wheel 8, through heat exchanger 18 and pushes air along line 20 and into indirect evaporative coolers 22 and 26. Air is exhausted from indirect evaporative coolers 22 and 26 along lines 66 and 67. It will be appreciated that other locations for fan 10 can be used.

A bypass loop 56 can be provided which takes outdoor air 4 past desiccant wheel 8 and heat exchanger 18.

Because air stream 14 leaving desiccant wheel 8 has a temperature higher than outdoor ambient air, for efficient processing or cooling, it is preferred to cool the air or remove heat therefrom by passing air stream 14 through heat exchanger 18 as noted. Exterior or outdoor air entering desiccant wheel 8 can have a temperature in the range of about 75° to 110° F., and the temperature exiting desiccant wheel 8 typically is in the range of 100° to 200° F. Further, typically, air stream 20 of air leaving heat exchanger 18 usually has a temperature in the range of 100° to 140° F.

In the present invention, air from heat exchanger 18 is introduced to indirect evaporative cooler 22 where it is cooled further to provide cooled dry air typically having a temperature in the range of 55° to 75° F. Different indirect evaporative coolers may be used, as will be explained later. Typically, the indirect evaporative coolers have dry channels and wet channels with the air from heat exchanger 18 first entering the dry channels of indirect evaporative cooler 22. A portion of the air from the dry channels is directed along the wet channels and then exhausted along line 66. The remainder or a portion of the air from the dry channels of indirect evaporative cooler 22 is directed into the wet channels of indirect evaporative cooler 26 and then exhausted along line 67.

After the air stream is cooled in indirect evaporative cooler 22, it is passed along line 24 to a second indirect evaporative cooler 26. In indirect evaporative cooler 26, the temperature of the air can be reduced further.

In the present invention, process air to be supplied to the building is comprised of return air from conditioned space 30, outdoor air or a mixture thereof. Preferably, the process air is supplied from fan 33 along process air line 35 to the dry channels of indirect evaporative cooler 26 where it is cooled and then directed along line 28 to conditioned space 30. After leaving indirect evaporative cooler 26, the process air may be passed through a direct evaporative cooler (not shown) where the temperature of the air is reduced further and a controlled amount of humidity is added thereto to provide conditioned air having a controlled amount of humidity and temperature.

The air conditioning system shown in FIG. 1 permits controlled operation of indirect evaporative cooler 26. That is, the humidity of return air 32 can be adjusted so as to permit lowering of the humidity and control of humidity in the conditioned space. In addition, the humidity of return air 32 can e adjusted for maximum heat transfer from the dry channels to the wet channels in indirect evaporative cooler 26. In this aspect of the invention, a portion of return air 32 is removed along line 68 and introduced to dry air in line 16 where it is mixed. A portion of dry air from line 20 is returned along line 69 and introduced to fan 33 where it is mixed with return air from line 33. The dry air mixed with the return air operates to lower the humidity in the return air and thus control the humidity in the conditioned space. For example, the return air humidity can be controlled at or just above the dew point as desired by introduction of a controlled amount of dry air along line 69. Thus, it can be seen that the humidity of the return air can be adjusted as required.

Figure 2:
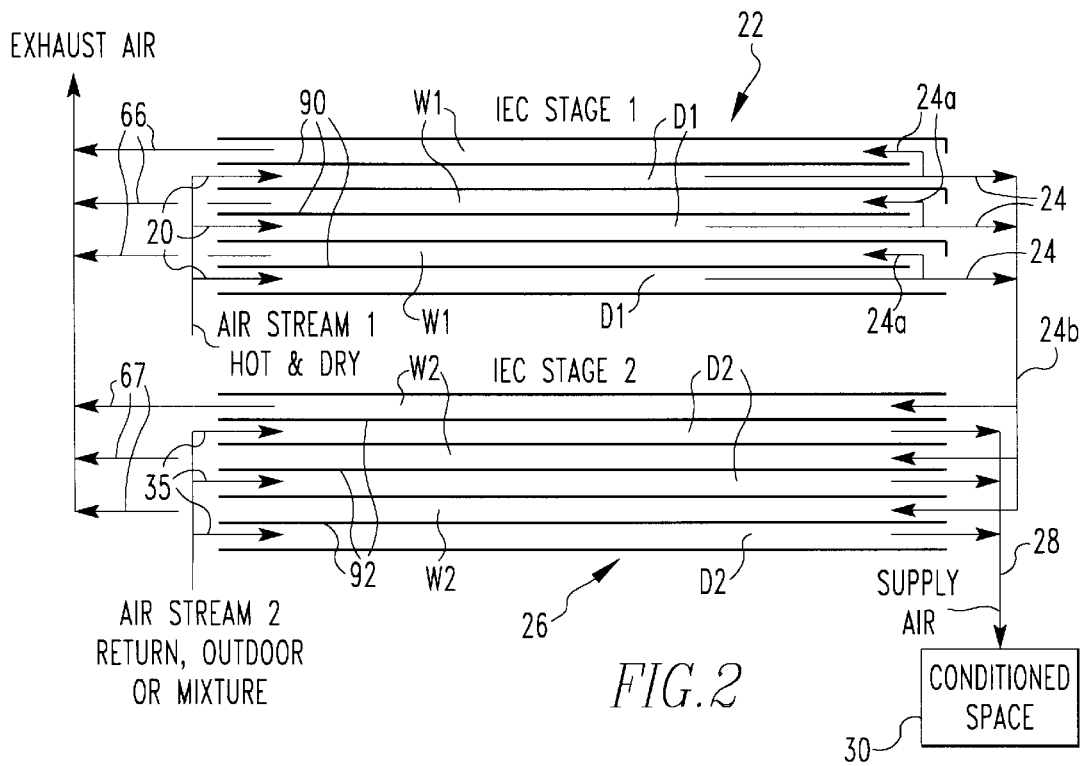
FIG. 2 is a schematic representation of air flow in two indirect evaporative coolers in accordance with the invention.

FIG. 2 shows air flow through indirect evaporative coolers 22 and 26. Thus, the air flow is shown through the dry channels D1 and D2 and wet channels W1 and W2 of indirect evaporative coolers 22 and 26. Air stream 1, denoted as 20 in FIG. 2, is air which has passed through desiccant wheel 8 and heat exchanger 18 and has a very low level of humidity. Air 20 is introduced to dry channels denoted D1 which are in heat exchange relationship with wet channels W1 through walls 90. Air 20 passes along channels D1 and is cooled by giving up heat through walls 90. Air 20 emerges as cooled air 24. A portion 24a of the cooled air 24 (15 to 50%, preferably 20 to 30%) is returned along wet channels W1 and extracts heat from the dry channels through walls 90. Air portion 24a evaporates water thereinto as it traverses wet channel and emerges as wet heated air 66 which is exhausted to the atmosphere. The water in wet channels W1 can be supplied by spray or by wicking action, for example. The remaining portion of the cooled air 24 is directed along line 24b where it is introduced to wet channels W2 of indirect evaporative cooler 26 traversing wet channels W2 and emerging as exhaust air 67. The exhaust air has substantially increased temperature by adsorbing heat from dry channels D2 and contains a high level of water by evaporating water thereinto in the wet channel as noted herein. Process air (air stream 2) is directed along process air line 35 into dry channels D2 of indirect evaporative cooler 26 and emerges as conditioned or supply air 28 which is directed to the conditioned space. The process air is cooled as it traverses dry channels D2 by giving up heat through walls 92 into the counterflowing air in wet channels W2.

The indirect evaporative coolers of this invention are heat exchangers where the air streams are separated by thin water impervious partitions or walls. The walls may be designed as plates or tubes or other configurations where the walls have a high surface area for heat transfer. In one set of passageways for air, called the "wet channels", water is evaporated, providing a heat sink. Heat is then transferred across the partitions from the hotter air stream in the second set of passageways, called the "dry channels", to the cooler air in the wet channels. As the enthalpy of the air in the wet channels increases from heat across the wall, the air's saturation point increases, allowing more water to be evaporated and additional heat to be transferred. Although the indirect evaporative cooler stages can be operated with co-current or cross-flow air streams, it is preferred that the air streams run counter-current to each other so that the air exhausted from the wet channels is as close to the inlet temperature of the dry stream as possible.

For the purpose of this invention, two stages of indirect evaporative cooling are used. The first air stream (drier and hotter) is pre-cooled in the first stage prior to entering the wet channels of the second stage where second air stream is to be cooled. Otherwise, the lowest temperature which could be achieved in the wet channels would be the wet bulb temperature of the entering air. By pre-cooling this air the wet bulb temperature of the air is lowered and the theoretical limit becomes the dew point temperature of the entering air rather than its wet bulb temperature.

If the temperature in this "dry" set of channels falls below its dew point, condensation will occur. Therefore, although these channels have been designated "dry" channels they may actually have liquid water forming on the walls. This condensation can be desirable because it reduces the moisture content of the supply air to the conditioned space. A drain may be provided in this set of channels to remove the condensed water. This water can then be used to supplement water feeding the wet channels where evaporation is occurring. Meanwhile, the air traveling in the wet channels counter-current to the second air stream, extracts heat from the dry channels and exits hotter and very moist.

Preferably, the system of the present invention is operated in a recirculation mode where return air from the conditioned space is processed and returned to the conditioned space as supply or conditioned air.

In the air conditioning system of the present invention, the desiccant in the desiccant wheel is regenerated by heated air from burner or heater 34 which is directed along line 36 to desiccant wheel 8 where it is passed therethrough to remove water from desiccant wheel 8 by vaporization. Typically, the heated air in line 36 has a temperature in the range of 150° to 375° F. Further, preferably, heated air from burner 34 is drawn through line 38 from desiccant wheel 8 by fan 40 where it may be expelled to the atmosphere through line 42.

In the present invention, desiccant wheel 8 can be regenerated using a gas burner as noted or any other heat source to heat the air. The gas burner exhaust and heated air can be passed directly through desiccant wheel 8 at relatively high temperatures for purposes of regeneration. It is important to remove any residual exhaust gases from desiccant wheel 8 prior to introducing process air thereto in order to avoid contamination of the conditioned air. Thus, in the present invention, a fresh air purge can be introduced along line 44 immediately after the regenerative step and before introduction of process air, e.g., outdoor air or recycled air, from the conditioned space. Even though the primary purpose of the purge is to remove residual gases from the desiccant wheel, the purge also has the effect of cooling desiccant wheel 8 prior to introduction of process air thereto. To recapture heat removed from desiccant wheel 8 by the purge, the air purge stream exiting desiccant wheel 8 can be removed along line 46 and introduced as air for burning or heating in burner 34.

In the present invention, air is used to cool heat exchanger 18 and thus hot air from heat exchanger 18 is removed along line 48 and introduced for heating for regeneration, for example, burning in burner 34. Air used to cool heat exchanger 18 can be outdoor air which may be introduced along line 50.

It should be noted that three separate air streams are utilized in the air conditioning system of the invention. That is, one stream of air used for regeneration purposes is drawn through line 50, heat exchanger 18, line 48 and burner 34 by fan 40 and purge air may be drawn through line 44, desiccant wheel 8, line 46, burner 34, line 36, back through desiccant wheel 8, after heating, by fan 40. A second stream of air is drawn or pushed through the air conditioning system using fan 10. A third stream of air is introduced to indirect evaporative cooler 26 from fan 33 and recirculated into space 30 as conditioned air.

For purposes of efficiency, if humidity in outdoor air introduced along line 4 is low, a sensor can be provided to direct process air or a portion thereof around desiccant wheel 8 and heat exchanger 18 along line 56 to permit flow of air therethrough to line 20. Simultaneously therewith, burner 34, fan 40 and desiccant wheel 8 can be shut down or operated at reduced loading or capacity, further improving economic operation of the cooling unit.

With respect to indirect evaporative coolers 22 and 26, a water source is provided and water is introduced thereto along lines 60 and 62.

The subject invention operates with an indirect evaporative cooling device that can effectively utilize moister and hotter inlet air than a system with a heat wheel and a direct evaporative cooler. In the present invention, outdoor air is dehumidified before entering the indirect evaporative cooler. The air used for space cooling is sensibly cooled along a constant absolute humidity line which typically is a 60 to 85% approach to its dew point. The air leaves the indirect evaporative cooler and is then introduced to another indirect evaporative cooler. A second stream of air is passed through the wet channels of the indirect evaporative cooler becoming saturated with moisture, providing a cold sink for the device. Preferably, this air is passed countercurrent to the air in the dry channels gaining heat across the walls and exiting at a temperature approaching the inlet temperature of the dry channels. As the temperature of the air in the wet channels increases, its capacity for moisture also increases allowing further evaporation to take place. The hot, moist air exiting the wet channels is exhausted to the exterior. The optimum amount of exhaust is a function of the change in enthalpy for each air stream in the evaporative cooler. The enthalpy change in the first air stream must balance that in the second air stream. Since the enthalpy of saturated air increases non-linearly with higher temperature, the ratio of exhaust air can normally be maintained less than 50% of the inlet air stream. The outlet condition achieved by the indirect evaporative cooler depends on the starting condition of the secondary air stream. Therefore, it is preferred to use the air exiting the dry channels for the evaporative process in the wet channels.

Heat exchanger 18 is important to the present invention because it increases the efficiency of the subject air conditioning system. That is, the use of heat exchanger 18 greatly reduces the amount of heat that has to be removed in indirect evaporative coolers and also reduces the amount of heat that has to be added to the system for regeneration by, for example, burner 34. Both savings significantly increase the overall efficiency of the air conditioning system. For example, the coefficient of performance, for the system can be increased significantly. The use of heat exchanger 18 in the air conditioning system of the invention can result in coefficient of performance values in the range of about 0.7 to 1 or higher. For example, if the temperature of inlet or outdoor air to the system is 85° F., temperatures of the air leaving the desiccant wheel 8 can be about 170° F. leaving the hottest portion of the wheel, and thus, air at 170° F. is introduced to indirect evaporative cooler 22. However, if the air leaving desiccant wheel 8 at 170° F. is passed through heat exchanger 18, the temperature can be reduced substantially, for example, to about 130° F. or lower. Thus, the amount of heat required to be removed from the air in indirect evaporative cooler 22 is substantially reduced. Thus, the overall efficiency of the air conditioner has been substantially increased.

Heat exchanger 18 has another advantage which results in increased efficiency of the subject air conditioning system. That is, heat exchanger 18 used in the present invention is an air to air heat exchanger. For purposes of cooling process air from desiccant wheel 8 in heat exchanger 18, a source of outside air is used. Outside air is introduced along line 50 and is passed through heat exchanger 18 as shown in FIG. 1 for cooling heat exchanger 18. The temperature of outside air used for cooling heat exchanger 18 is significantly increased. For example, the temperature of outside air used for cooling heat exchanger 18 can increase from ambient, e.g., about 85° F., to 150° F. or even higher. Thus, in the present invention, as noted, the cooling air exiting heat exchanger 18 is further heated in burner 34 and then passed through desiccant wheel 8 for purposes of regeneration. This is another important feature of the present invention which results in the high coefficient of performance values. That is, the amount of heat required to be added for regeneration by, for example, burner 34 to provide a stream of air in line 36 having the necessary temperature to regenerate desiccant wheel 8 is significantly reduced. The temperature of air in line 36 used for regeneration is typically in the range of about 200° to 375° F., depending on the desiccant used in desiccant wheel 8. The desiccant can be selected to have a low (about 200° F.) or high (350° F.) temperature of regeneration.

Heat exchanger 18 can be any heat exchanger that permits heat exchange from one air stream to another. For example, heat pipes or a loop having two coils and a circulating heat transfer liquid can be used. Air-to-air heat exchangers which have been used have been fabricated out of aluminum parallel plates. Such heat exchangers are available from Xetex or DesChamps Laboratories.

As shown in FIG. 1, cooling air from heat exchanger 18 removed along line 48 is preferably combined with purge air removed from desiccant wheel 8 along line 46. Purge air exiting desiccant wheel 8 along line 46 can have a temperature of 250° to 260° F., for example. Thus, when purge air is combined with heat exchanger air removed along line 48, the amount of heat required to be added by burner 34 is further reduced.

Figure 10:
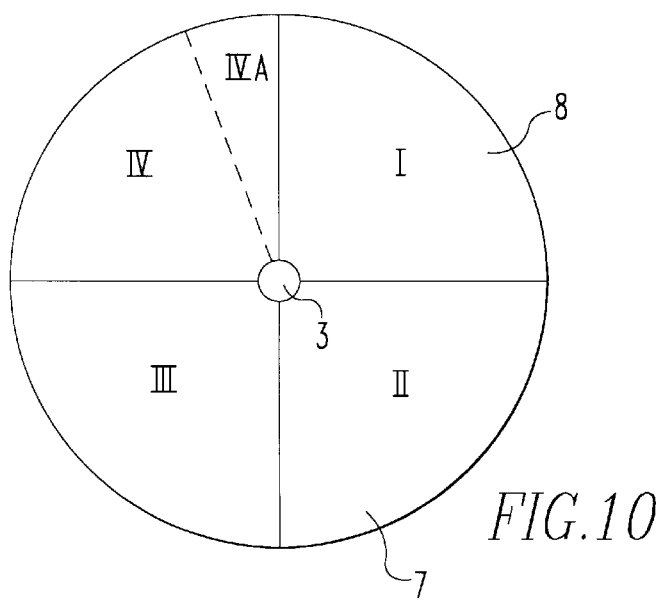
FIG. 10 is a schematic representation of a desiccant wheel showing four quadrants.

FIG. 10 depicts the face of desiccant wheel 8 as seen by entering outdoor air. In the present invention, quadrants I, II and III can be used for passing outdoor air therethrough for purposes of removing moisture therefrom. Quadrant IV is typically used for purposes of regeneration in which hot air and gas from burner 34 flow in a direction counter to the outdoor air. Purge air (which is optional) introduced along line 44 is introduced immediately after regeneration and can be accommodated as a small segment, e.g., IVA, of quadrant IV in which the purge air is flowed counter to the regeneration stream, as shown in FIG. 1. It will be understood that these quadrants are selected for illustration purposes, and that the quadrants used for dehumidifying and regeneration are not necessarily 90° sections and may be changed to suit particular needs. For example, quadrants I and II can be used for passing outdoor air therethrough for dehumidifying and quadrants III and IV used for regeneration by passing heated gas therethrough in a direction opposite to the outdoor air flow. A small segment of quadrant I, such as 5° to 10°, may be used for purposes of purging wheel 8 before introducing process air thereto.

If regeneration is carried out in quadrant IV, with or without a purge, it will be seen that the hottest part of desiccant wheel 8 in FIG. 10 (showing inlet face of wheel) will be encountered in quadrant I when desiccant wheel 8 turns clockwise. Thus, in one preferred mode of operation, air emanating from quadrant I is separated from the air in quadrants II and III. In this mode, only the air dehumidified in quadrant I is passed through heat exchanger 18. Typically, the air from quadrant I or immediately after regeneration is the hottest. For example, if outdoor air introduced to desiccant wheel 8 has a temperature of 85° F., the temperature of air emanating from the quadrant I can be 170° F., for example, and the air emanating from quadrants II and III can be about 130° F. Thus, it is more expeditious to pass the 170° F. air through heat exchanger 18 because of the larger temperature differential. Further, this reduces the pressure drop through heat exchanger 18 because only one third of the air is passed through heat exchanger 18. It should be understood that the amount of hot air passing through heat exchanger 18 can be varied depending on conditions. For example, 20 to 75% of the air can be directed through heat exchanger 18. In addition, heat exchanger 18 can be sized smaller and thus is more economical to make.

In the present invention, reference is made to desiccant wheel 8. However, it should be understood that desiccant wheel 8 can be replaced with a desiccant body and air duct work provided to periodically regenerate a part of the desiccant body while another part of the body is being used to remove moisture from the outdoor air. Further, the outdoor air stream can be divided into a first air stream and a second air stream. The body can be regenerated by passing hot gases through the body after the first air stream. The second air stream gets depleted of moisture and also cools the body. Preferably, the second air stream is passed through an air-to-air heat exchanger before being united with the second stream for cooling in the indirect evaporative cooler. Such is contemplated within the scope of the invention. When a desiccant wheel is used, typically the wheel rotates at a speed of about 1 to 30 rph and the function of removing moisture from process air and regenerating desiccant wheel 8 using a hot air stream or combustion products from burner 34 is performed on a continuous basis.

Desiccant wheel 8 has a central hub 3 and a casing 7 (FIG. 10). Between hub 3 and casing 7 is provided a regenerative media or paperboard having desiccant dispersed therein for removing moisture from the process air stream.

In one embodiment, the media is fabricated by providing alternating layers of flat and corrugated paperboard that are positioned to provide a multiplicity of open-ended passages parallel to the axis of rotation to permit air to flow therethrough. Typically, the media is formed by winding a web of corrugated paperboard (having a flat sheet of paperboard bonded to one side) about hub 3 until a multi-layered media is built up that extends to outer casing 7. The corrugated paperboard having one side flat is made by bonding or positioning a flat strip of paperboard over a corrugated strip of paperboard. The width of the strip determines the width of the wheel, and the edges of the paperboard forms the faces of the wheel. It should be understood other fabrication techniques that form passages may be used.

The media or paperboard for desiccant wheel 8 can be comprised of a fibrous material and any material that operates to remove moisture from an air stream such as process air on a continuous basis.

While desiccant wheel 8 can comprise any desiccant, a preferred, adsorptive desiccant wheel is formed from a desiccant paperboard comprising temperature-resistant, fibrillated or non-fibrillated synthetic organic or inorganic fibers or mixtures thereof and a desiccant material containing either an X-type zeolite in conjunction with silica gel and/or pseudoboehmite alumina or a chemically modified Y-type zeolite.

Suitable zeolites include 3A, 4A, 5A, 13X, NaY, HY and USY with 3A and 4A zeolites being preferred. Particle size of the zeolites can range from 0.1 to 50 $\mu$m with a preferred particle size being 1 to 4 $\mu$m.

The desiccant utilized in desiccant wheel 8 can comprise different blends of alumina, silica gel and zeolite. For example, the desiccant can comprise 20–60 wt. % alumina, 0–40 wt. % silica gel, the balance comprising X- or Y-type zeolite. In a preferred embodiment, the desiccant can comprise 20 to 50 wt. % alumina, 20 to 30 wt. % silica gel, with the balance X- or Y-type zeolite. For example, the desiccant can comprise 45 wt. % alumina, 35 wt. % silica gel and 20 wt. % 13-X zeolite, or it can comprise 33 wt. % alumina, 33 wt. % silica gel and 34 wt. % 13-zeolite. In certain instances, the desiccant can comprise alumina and zeolite, for example, 50 wt. % alumina and 50 wt. % 13-X zeolite.

Figure 3:
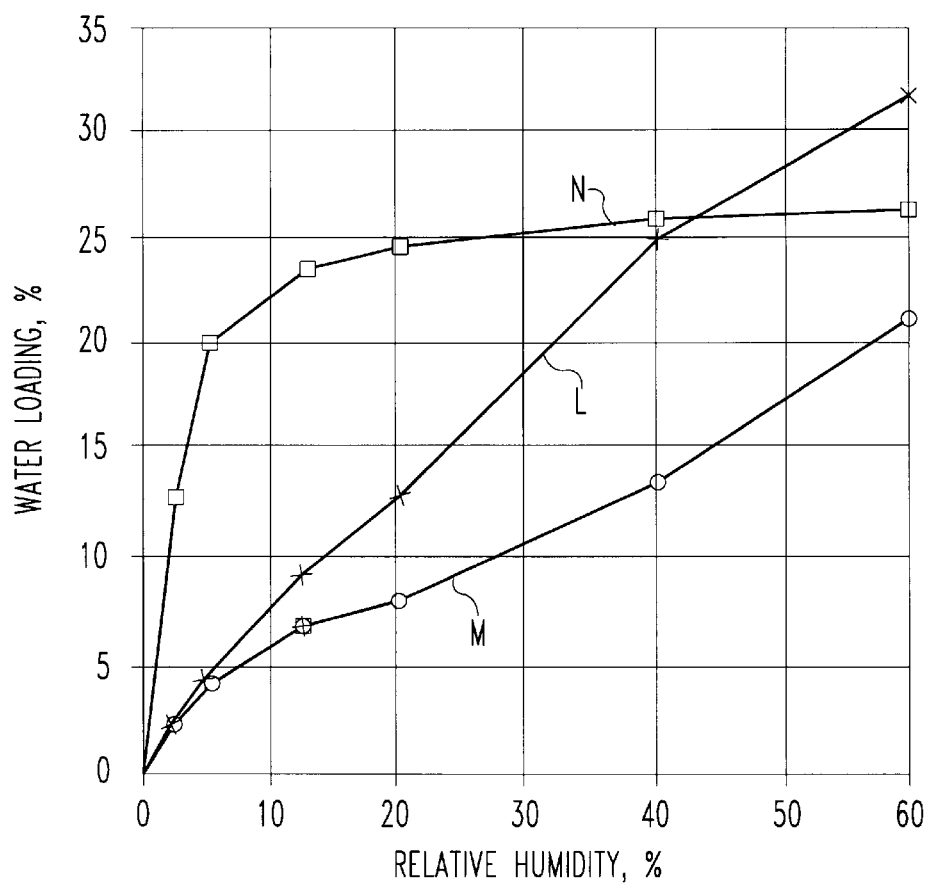
FIG. 3 is a graph comparing water adsorption isotherms for silica gel, pseudoboehmite alumina and a 13-X molecular sieve.

The alumina component is characterized by pseudoboelunite phase, and may comprise up to 70% of the total desiccant weight. Aluminas characterized by high dispersability in acid are preferred, because of their narrow distribution of internal small pores. Excessive macroporosity is undesirable because it contributes to water adsorption capacity at high relative humidities (i.e., greater than 60% RH). Commonly available acid-dispersible aluminas useful in the present invention are VERSAL® 850 and VERSAL® 900 sold by LaRoche Industries, Inc., and CATAPAL D® sold by Vista Chemicals. As seen from Isotherm M in FIG. 3, the total equilibrium capacity of pseudoboehmite aluminas are too low (14–16%) at 40% RH, and the shape of their isotherms in the 40–60% RH range even become concave-up, which contributes to spreading of their dynamic wavefronts in the end application, thereby making them unacceptable as a desiccant by themselves in high-efficiency dehumidification systems, although they may be advantageously combined with 13-X zeolite in the present invention.

The silica gel suitable for use in the preferred desiccant composition is available from Davison Division of W. F. Grace under the designation SYLOID® 63 silica gel. As illustrated by Isotherm L in FIG. 3, this silica gel exhibits nearly a linear isotherm and is unable to completely contain moisture wavefronts during adsorption. Therefore, a desiccant wheel containing only silica gel as a desiccant component is less desirable for use in a high-efficiency dehumidification or cooling system regenerated at high temperatures. However, because silica gels are good for imparting moisture uptake in the 30–50% RH range, they can be advantageously blended with a desiccant such as 13-X zeolites having enhanced moisture uptake in the low humidity range.

The desiccant composition of the invention can utilize X-type and Y-type zeolites. X-type zeolites exhibit predominantly Type-1 isothermal behavior (see Isotherm N, FIG. 3 for 13-X molecular sieve) and have been found to yield improved performance compared to A-type zeolites. X-type zeolites have channel openings of about 9 Å and compared to A-type zeolites, have a slightly higher silica-to-alumina ratios (e.g., 2–3:1).

In order to determine the adsorption isotherms of two different desiccant blends, aliquots of 13-X molecular sieve sold by the Linde Division of UOP, VERSAL® 900 pseudoboehmite alumina, and SYLOID® 63 silica gel were heated at 200° C. for 1 hour to determine their respective weight losses so that the desiccant components could be proportioned on a dry weight basis. Loses were 10.4%, 10.7% and 2.0%, respectively, for the components. Physical blends denominated composites A and B were prepared as follows:

|  | 13-X Zeolite | | Pseudoboehmite | | Silica Gel | |
| --- | --- | --- | --- | --- | --- | --- |
| Composite | g | wt. % | g | wt. % | g | wt. % |
| A | 22.3 | 20 | 50.4 | 45 | 35.7 | 35 |
| B | 37.9 | 34 | 36.9 | 33 | 35.7 | 33 |

Composites A and B were individually mixed with an amount of water in excess of that required to fill all the pores of the desiccant. The aqueous mixtures were then dried at 105° C. for 16 hours. The resulting hard-packed composites were then crushed to approximately ⅛-inch granules and thermally activated in air at 200° C. for 1 hour.

Figure 4:
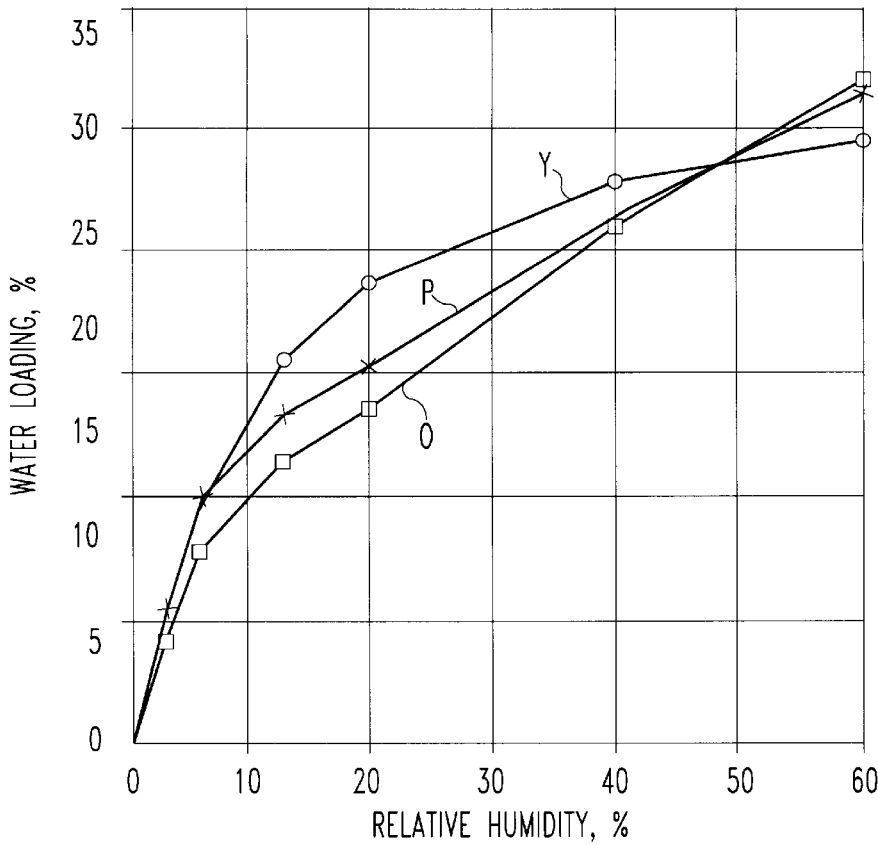
FIG. 4 shows water adsorption isotherms of two example desiccant composites of the present invention compared to that of a Type-1M desiccant.
Figure 5:
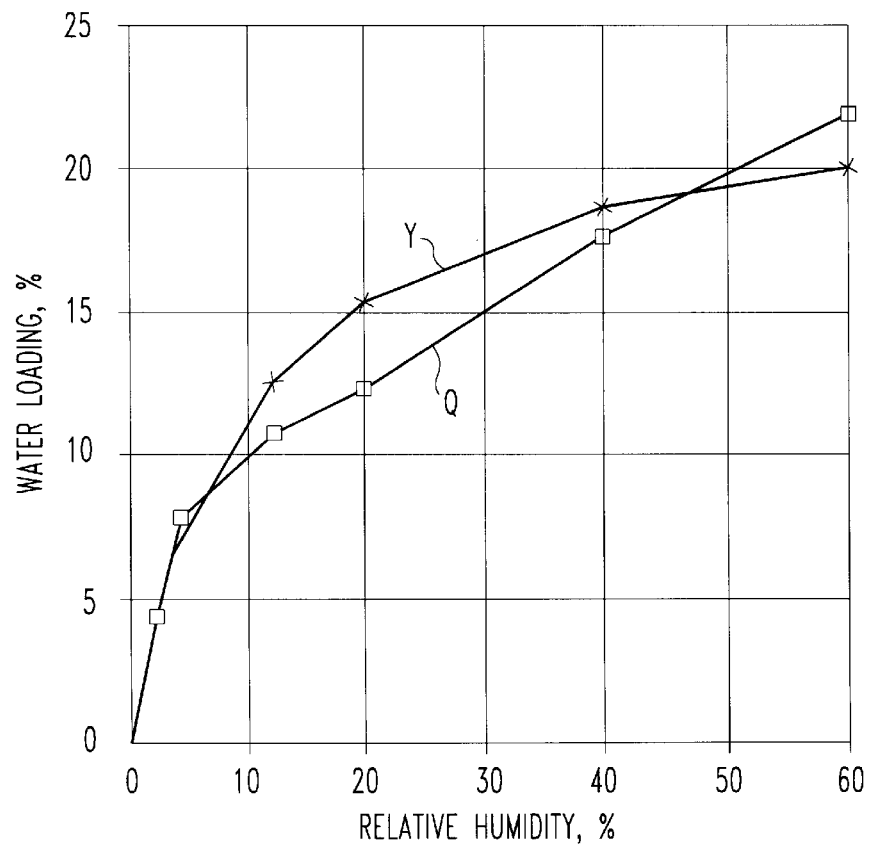
FIG. 5 shows water adsorption isotherms of a handsheet paper made from the 1:1:1 13-X:silica:pseudoboehmite blend of the present invention.
Figure 6:
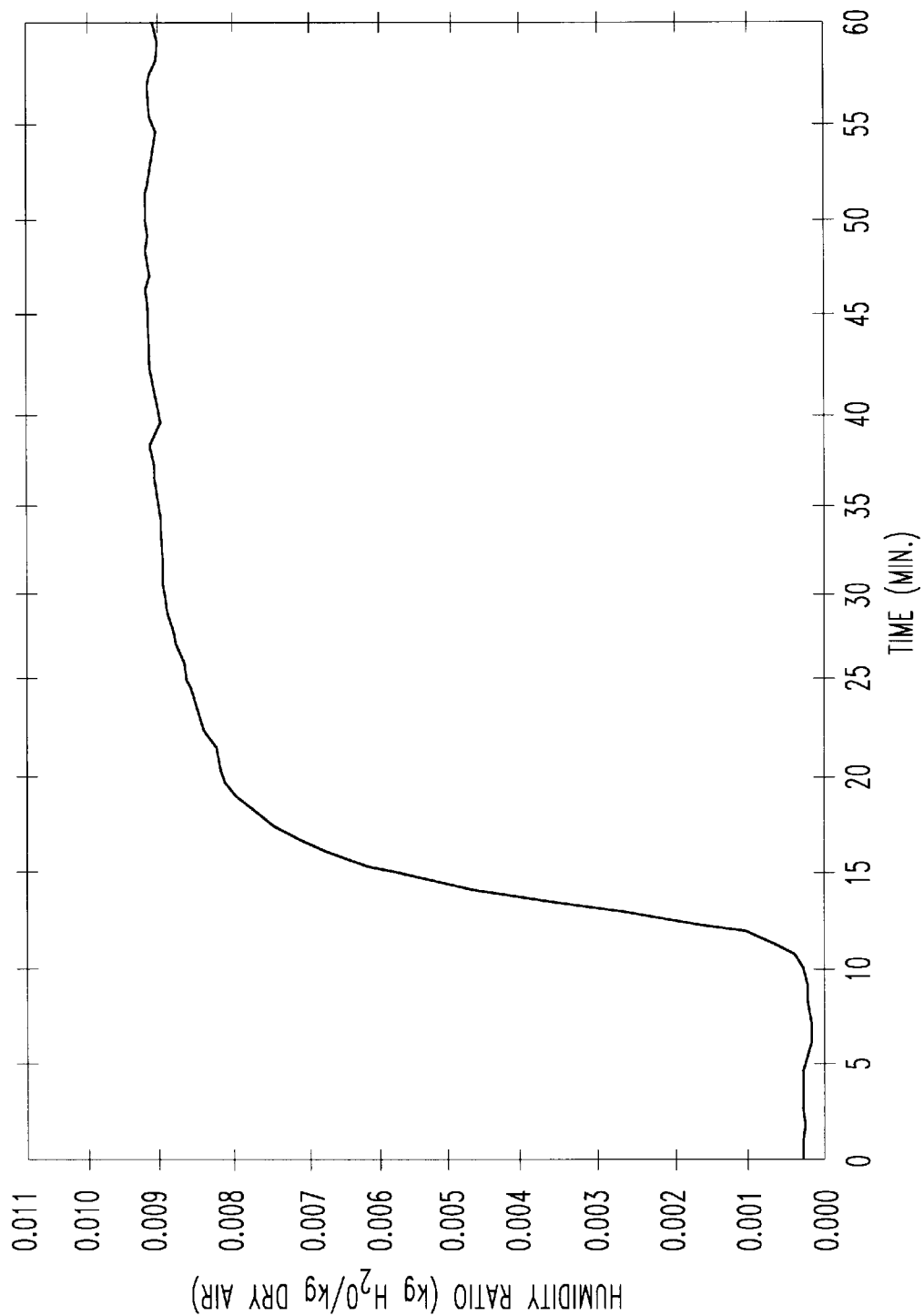
FIG. 6 is a graph showing the dynamic behavior of paper made from the desiccant composite B.
Figure 7:
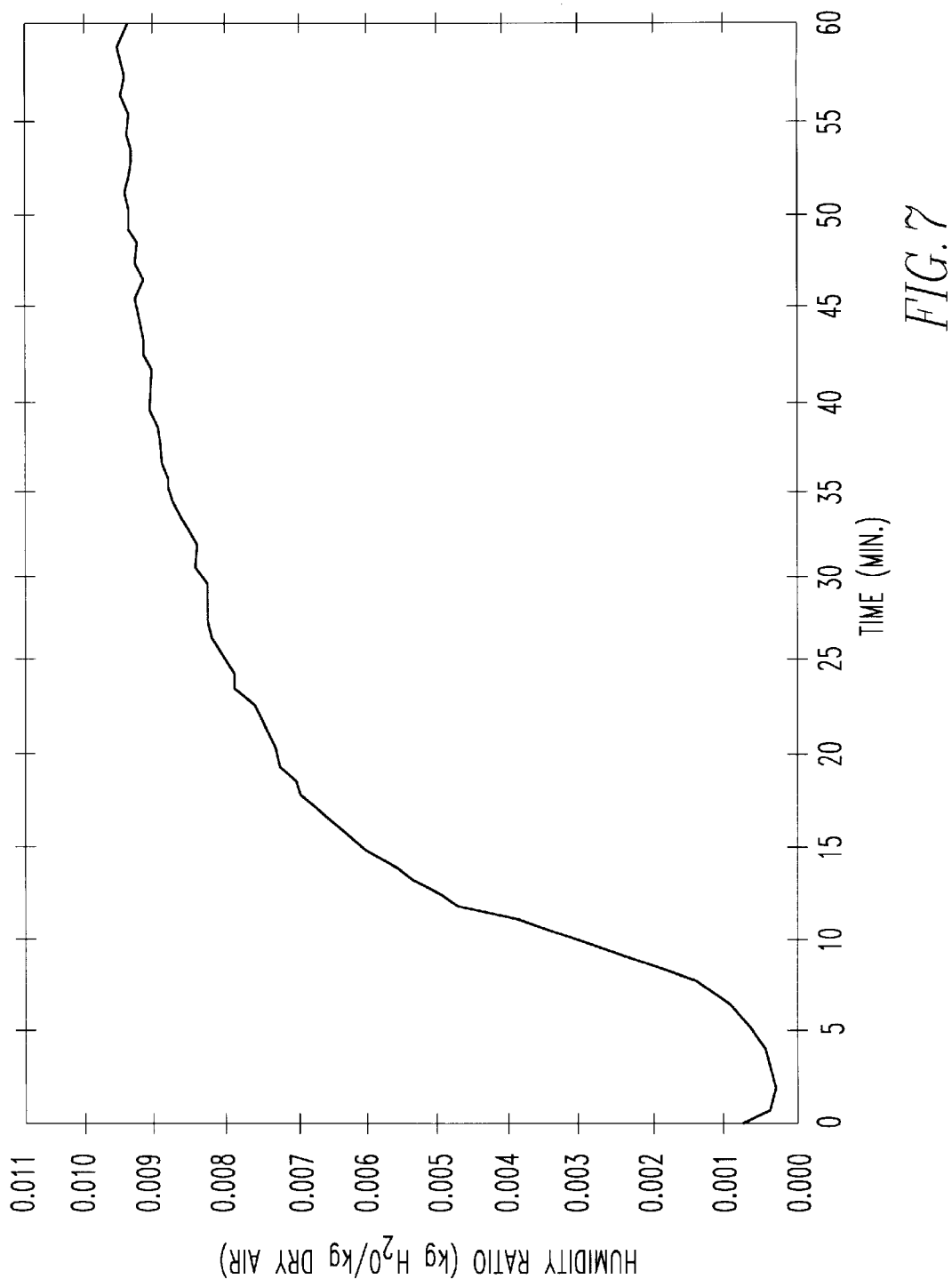
FIG. 7 is a graph showing the dynamic behavior of a core section of a wheel manufactured with a silica gel desiccant composition.

Adsorption isotherms were determined for composites A and B as previously described, and the results are shown in FIG. 4. As can be readily seen, the alumina and silica gel constituents modified the normal Type-1 behavior of the 13-X zeolite component illustrated as Isotherm N in FIG. 3 to isotherms O and P for the A and B composites, respectively, that more closely approach the desirable Type 1-M behavior of Curve Y. Curve Y was derived, assuming a water loading of 25% at 60% RH. An isotherm of Composite B containing equal parts of 13-X zeolite, alumina and silica gel closely approaches the Type 1-M curve Y over the entire range of 0–60% RH, particularly when compared with the isotherms of the individual 13-X zeolite, alumina and silica components.

An alternative to a composite-based desiccant blend, as described above, is the use of a Y-type zeolite, since its structure is stable over a silica-to-alumina mole ratio range of 3 to 6. Techniques have been developed in the art for chemically modifying the silica-to-alumina ratio of Y-type zeolites by either varying the silica content of the initial solution batch or by de-aluminating the zeolite subsequent to the crystallization step by acid leaching (see, e.g., U.S. Pat. Nos. 3,293,192 and 3,402,996 issued to Maher et al; U.S. Pat. No. 4,701,431 issued to Pine; and U.S. Pat. No. 5,052,188 issued to Komarneni et al).

Figure 8:
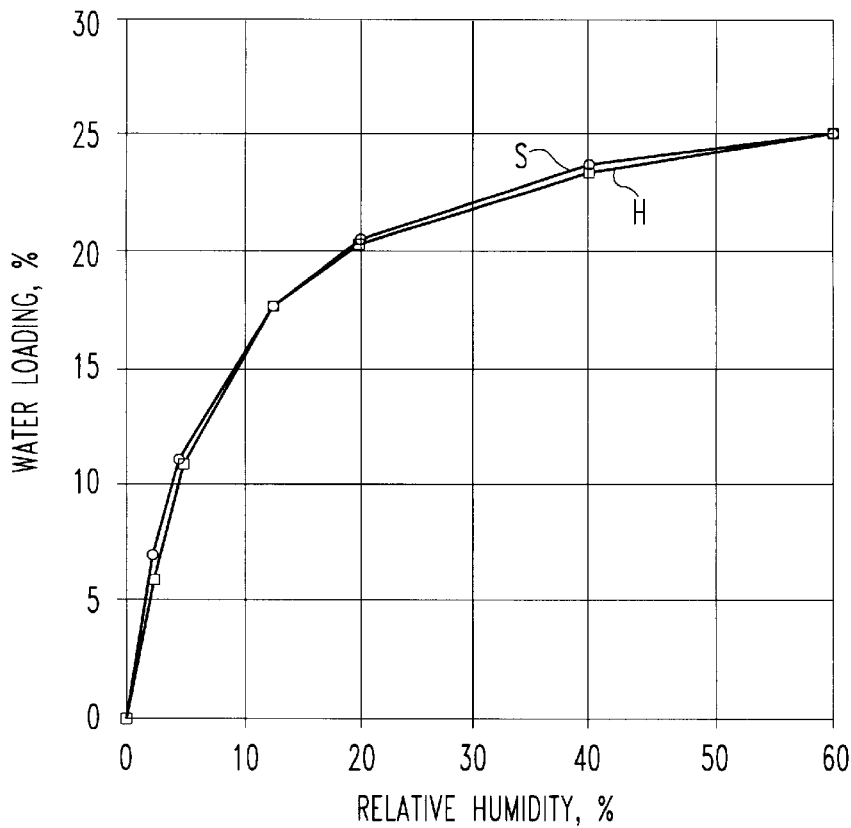
FIG. 8 is a graph showing the isotherm for a modified, Y-type zeolite.
Figure 9:
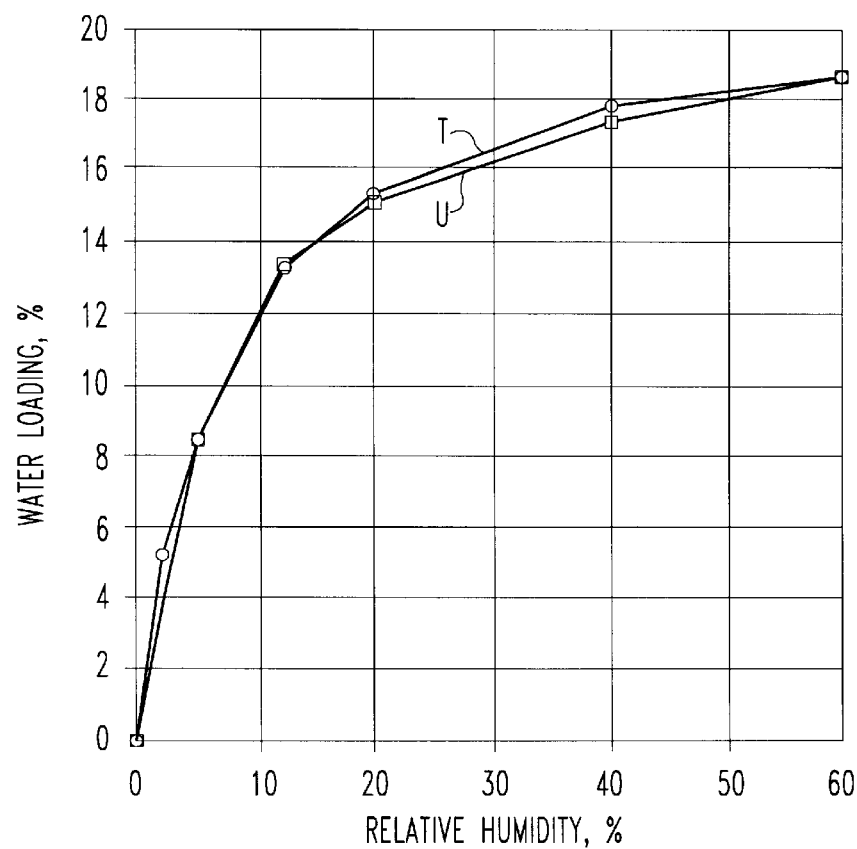
FIG. 9 is a graph showing the isotherm for paper of the present invention made from the chemically modified, Y-type zeolite.

It has now been found that ultra-stable, Y-type zeolite typically yields water adsorption isothermal behavior nearly identical to that of an ideal Type-1M desiccant. FIG. 8 compares Isotherm R, the water adsorption isotherm for Valfor CBV-500 sold by P.Q. Corporation, to Isotherm S, an isotherm with a separation factor of R=0.07. Moreover, as shown in FIG. 9, a handsheet made using the modified Y-type zeolite desiccant provides an Isotherm U that almost precisely matches a normalized Isotherm T with the same separation factor of R=0.07, thereby falling within the preferred R=0.030–0.10 range. Therefore, this material alone meets the Type-1M isotherm standard with high moisture uptake (i.e., 25%) at 60% RH. This material could be used as a single desiccant component to yield alone, or when blended with other desiccants, high-efficiency desiccants for wheel manufacture.

Zeolites that are highly suitable for use in the present invention include zeolites which permit the desorption of water at moderate to low temperatures. Such zeolites include zeolite Y-85, rare earth exchanged zeolite LZ-210 and low cerium exchanged zeolite Y-84 as defined in U.S. Pat. No.

4,503,023, columns 12 and 13, the patent incorporated herein by reference. Rare earth exchanged zeolite LZ-210 can be prepared by subjecting LZ-210 to a rare earth exchange step followed by dry air calcination at a temperature of 55° to 850° C. Y-85, a steam-stabilized form of zeolite Y, is described in U.S. Pat. No. 5,208,197, incorporated herein by reference. Y-84 zeolite is prepared in a manner similar to Y-85 zeolite. In preparing Y-84 or Y-85 zeolite, the second ammonium ion exchange is carried out at greater than pH of 4 and thereafter the resulting zeolite is subjected to a rare earth ion exchange in which the zeolite is contacted with a solution of rare earth salt. It should be understood that lanthanum or cesium may be incorporated by exchange into the Y-84 or Y-85 zeolite.

In the present invention, fibrillated organic fibers, because of their strength and ability to interlock, provide suitable reinforcement at levels as low as 15% by weight of the total desiccant paperboard.

A number of different organic and inorganic fiber materials may be used for the desiccant paper for desiccant wheel 8, depending upon the temperatures at which desiccant wheel 8 is regenerated. For example, inorganic fibers such as fine-diameter fiberglass, mineral wool, or other ceramic materials, may be employed. Although such fibers are stable over a wide range of temperatures, they can suffer from cracking during the paper corrugation stage. Natural organic fibers such as cotton may also be used, although they are limited in regeneration temperature. Synthetic organic fibers useful in the invention are those comprising high-density polyethylenes, high-density polypropylenes, aromatic polyamides (i.e., aramids), polystyrenes, aliphatic polyamides, poly(vinyl chlorides), acrylics (e.g., CFF® fibrillated fibers sold by Cyanamic), acrylonitrile homopolymers, copolymers with halogenated monomers, styrene copolymers, and mixtures of polymers (e.g., polypropylene with low-density polyethylene, and high-density polyethylene with polystyrene).

However, due to its strength, light weight and temperature resistance, the preferred organic fiber for the desiccant wheel of the present invention is selected from aramids. The aramids are manufactured fiber in which the fiber-forming substance is a long-chain synthetic polyamide in which at least 85% of the amide (—CO—NH—) linkages are directly attached to the two aromatic rings. Such aramid fibers are available from DuPont under the trademark KEVLAR®. KEVLAR® is commercially available as a refined pulp designed for paper forming, such as KEVLAR® 303 pulp. During refining, the KEVLAR® fiber shafts are split at the ends into fibrils by means of application of high shear, thereby creating a tree-like structure. In the manufacture of paperboard, it has been discovered that the fibrils interlock to enhance the paperboard strength. KEVLAR® is stable in oxidizing atmospheres up to 450° C. Other high-temperature resistant aramids such as NOMEX®, available from DuPont, is suitable for formation of paperboard in the present invention. However, it is preferred that such fibers are refined or fibrillated in a similar manner.

For purposes of the present invention, KEVLAR® 303 pulp having fiber shafts that are approximately 12 $\mu$m in diameter and up to 4 mm in length is first dispersed to form an aqueous slurry. The slurry is then fed to a disc or other high-shear refiner, which is effective in further splitting the fibrillated fiber shafts into additional fibrils. After the refining step, the KEVLAR® 303 fiber shafts range from 1 mm to 4 mm in length with fibrils extending therefrom that are as small as 1 $\mu$m to 3 $\mu$m in diameter.

Desiccant wheel 8 can be manufactured using the above materials to provide a wheel or body which will readily adsorb moisture contained in ambient air and desorb the resulting moisture from the wheel during a regeneration cycle of short duration.

While any type of indirect evaporative coolers 22 and 26 may be used, it has been discovered that the indirect evaporative cooler disclosed in U.S. Pat. Nos. 5,301,518 and 5,318,843, incorporated herein by reference, is effective in conjunction with desiccant wheel 8 of the present invention in taking warm, high humidity, or moisture-laden air and in an economical manner, producing cool or chilled air with a controlled level of humidity.

Another type of indirect evaporative cooler that may be used employs a dry channel and a wet channel separated by a heat-exchanging partition wherein heat is extracted from air in the dry channel through the partition to the wet channel. The partition has a capillary porous material in contact with the wet side of the partition. Air passing through the wet side evaporates liquid out of the porous material thereby extracting heat from air in the dry side. Air used for purposes of evaporation in the wet side in the present invention is outside air, a portion of the air from the dry side, or air recirculated from the conditioned space. However, preferably the air used in the wet side is air which is cooled in the dry side or channel. The air streams flowing through the dry and the wet sides do not directly contact each other. In the present invention, air directed along line 20 enters the dry side of first indirect evaporative cooler 22 and is cooled as it passes therethrough. Thereafter, a portion of the cooled air is directed to the wet channels and the remainder of the cooled air exiting the dry channel can be directed to be cooled further in second indirect evaporative cooler 26 and a portion thereof directed to the space to be conditioned. Cooled air from the dry channels of indirect evaporative cooler 26 is directed into the wet channels of indirect evaporative cooler 26. Alternately, the remainder of the cooled air exiting the dry channels of indirect evaporative cooler 22 is directed to the wet channels of indirect evaporative cooler 26 and return air, or outdoor or a mixture thereof, is directed to the dry channels of indirect evaporative cooler 26 as process air and used as supply air for the conditioned space. Other indirect evaporative coolers that may be used in the present invention are described in U.S. Pat. No. 4,112,027, incorporated herein by reference.

While the invention has been described with respect to cooling, its use is not necessarily limited thereto. For example, the system may be used for heating where heat, for example, may be generated by the burner and such heat directed to the conditioned space with duct work (not shown), and such is contemplated within the invention.

EXAMPLE

Figure 11:
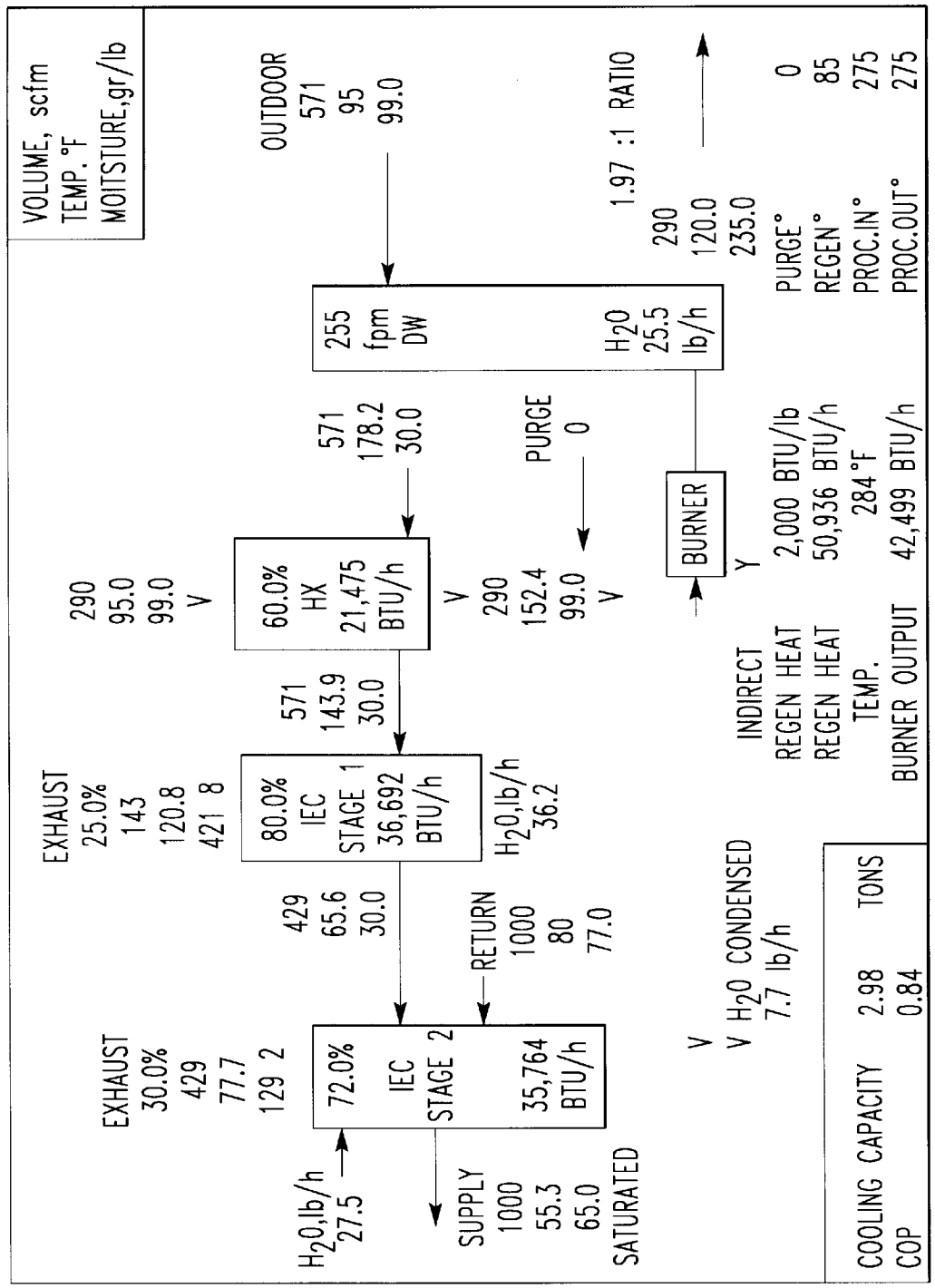
FIG. 11 illustrates air flow and conditions as air flows through a desiccant wheel, heat exchanger and two indirect evaporative coolers.

This example is illustrated in FIG. 11 and is based on the use of a desiccant wheel to remove moisture from outdoor air. The system performance is modeled from the performance of the individual components in the system. The adsorbent wheel is formed from desiccant paper having 20% fibrillated fibers. The desiccant has a Type 1M isotherm with a separation factor of 0.07. Outdoor air is fed to the desiccant wheel at 571 SCFM, temperature 95° F., and containing 99 grains $H_2O$/lb of air. After passing the process air through the desiccant wheel, the air has a temperature of about 178.2° F. and contains 30 grains $H_2O$/lb of air. After passing the air through heat exchanger, the temperature of air is reduced to 143.9° F. After passing the air through the first indirect evaporative cooler, the temperature is reduced to 65.6° F. at 30 grains $H_2O$/lb of air. For purposes of cooling the first indirect evaporative cooler, about 143 SCFM of dry air exiting the indirect evaporative cooler is required to be introduced to the wet side of the indirect evaporative cooler and exhausted from the system at about 143° F. The remainder of the dry cooled air from the first indirect evaporative cooler (429 SCFM) is introduced to the wet channels of the second indirect evaporative cooler. Also, return air at 80° F., 77 grains $H_2O$/lb of air is introduced at a rate of 1000 SCFM to the dry channels of the second indirect evaporative cooler. This provides 1000 SCFM supply or conditioned air at a temperature of 55.3° F. and moisture level of 65 grains $H_2O$/lb of air. The air is exhausted from the second indirect evaporative cooler at 429 SCFM, 77.7° F. and at 129.2 grains $H_2O$/lb of air. Also, water is condensed from the dry channels at about 7.7 lbs $H_2O$/hr. This model provides a cooling capacity of 2.98 tons and a coefficient of performance (COP) of 0.84.

The data for this model is produced in Table I.

TABLE I

State Point Data

|  | Temp. °F. | Dew Pt. °F. | Flow Rate cfm | Flow Rate scfm | Mass Flow lb/min | W lb/lb | W gr/lb | RH % | Enthalpy BTU/lb |
|---|---|---|---|---|---|---|---|---|---|
| 1 OA Wheel Inlet | 95.0 | 66.9 | 616 | 571 | 43.1 | 0.01414 | 99.0 | 40.0 | 38.40 |
| 2 HX Regen Inlet | 95.0 | 66.9 | 616 | 290 | 43.1 | 0.01414 | 99.0 | 40.0 | 38.40 |
| 3 Wheel Outlet | 178.2 | 35.1 | 697 | 571 | 43.1 | 0.00429 | 30.0 | 1.4 | 47.66 |
| 4 HX Regen Outlet | 152.4 | 66.9 | 345 | 290 | 21.8 | 0.01414 | 99.0 | 8.3 | 52.53 |
| 5 IEC 1 Inlet | 143.9 | 35.1 | 660 | 571 | 43.1 | 0.00429 | 30.0 | 3.2 | 39.35 |
| 6 IEC 1 Outlet | 65.6 | 35.1 | 431 | 429 | 32.3 | 0.00429 | 30.0 | 32.2 | 20.41 |
| 7 IEC 1 Exhaust | 120.8 | 110.5 | 173 | 143 | 10.8 | 0.06026 | 421.8 | 75.0 | 96.15 |
| 9 Bldg Return to IEC 2 | 80.0 | 59.9 | 1043 | 10000 | 75.4 | 0.01100 | 77.0 | 50.3 | 31.26 |
| 10 Supply | 55.3 | 55.3 | 993 | 1000 | 75.4 | 0.00929 | 65.0 | 100.0 | 23.35 |
| 11 IEC 2 Exhaust | 77.7 | 74.6 | 451 | 429 | 32.3 | 0.01845 | 129.2 | 90.0 | 38.87 |
| 12 Burner Outlet | 284.0 | 66.9 | 419 | 290 | 21.8 | 0.01414 | 99.0 | 0.6 | 84.95 |
| 13 Flue | 120.0 | 92.3 | 337 | 290 | 21.8 | 0.03357 | 235.0 | 44.4 | 66.21 |

While the invention has been described in terms of preferred embodiments, the claims appended hereto are intended to encompass other embodiments which fall within the spirit of the invention.

What is claimed is:

1. In a method of cooling a first stream of air in an air conditioning system wherein a first stream of air is dehumidified and cooled in first and second indirect evaporative coolers for purposes of conditioning a second stream of air for introducing to a conditioned space, the method comprising the steps of:

(a) providing an adsorption wheel having an adsorbent contained in a paper web and having a multiplicity of passages through which said first stream of air can flow for adsorbing moisture therefrom, the wheel capable of adsorption of moisture from said first stream of air and of regeneration;

(b) passing said first stream of air through said adsorption wheel to remove moisture therefrom;

(c) regenerating said adsorption wheel by passing hot gases therethrough to remove moisture from said adsorption wheel;

(d) providing a first indirect evaporative cooler and second indirect evaporative cooler, said first and second indirect evaporative coolers having dry channels and wet channels separated by moisture-impervious walls wherein heat is extracted from said dry channels to said wet channels through said walls;

(e) introducing air after passing through the adsorption wheel to said dry channels of said first indirect evaporative cooler to provide a cooled stream of air exiting said dry channels of said first indirect evaporative cooler;

(f) directing a portion of said cooled stream of air to said wet channels of said first indirect evaporative cooler;

(g) directing a second portion of said cooled stream of air exiting said dry channels of said first indirect evaporative cooler to the wet channels of said second indirect evaporative cooler for purposes of cooling said dry channels of said second indirect evaporative cooler;

(h) circulating a second stream of air to the dry channels of said second indirect evaporative cooler for providing conditioned air for introducing to the conditioned space; and (i) adjusting the humidity of said second stream of air prior to circulating said second stream of air to the dry channels.

2. The process in accordance with claim 1 wherein said adsorption wheel utilizes an adsorbent selected from the group consisting of silica gel, activated alumina and molecular sieves.

3. The method in accordance with claim 1 wherein said adsorption wheel utilizes a zeolite adsorbent selected from the group consisting of A-type zeolites, X-type zeolites and Y-type zeolites.

4. The method in accordance with claim 3 wherein said adsorbent is A-type zeolite.

5. The method in accordance with claim 3 wherein said adsorbent is 4A-type zeolite.

6. The method in accordance with claim 1 wherein said paper web contains 5 to 85 wt. % desiccant.

7. The improved enthalpy wheel in accordance with claim 1 wherein said paper web is comprised of 15 to 75 wt. % fibrillated fibers.

8. The method in accordance with claim 1 including introducing a purge stream of air to said adsorption wheel after said regeneration step and prior to passing said first stream of air through said adsorption wheel to purify said wheel.

9. The method in accordance with claim 8 including introducing said purge stream of air for heating to provide hot gases for regeneration of said wheel.

10. The method in accordance with claim 1 wherein said second stream of air is comprised of outdoor air, air returned from the conditioned space or a mixture thereof.

11. The method in accordance with claim 1 including the step of cooling air after passing through said adsorption wheel in an air-to-air heat exchanger prior to cooling in said first indirect evaporative cooler.

12. The method in accordance with claim 1 wherein said second stream of air is comprised of return air from said conditioned space.

13. The method in accordance with claim 1 wherein said second stream of air is comprised of outdoor air.

14. The method in accordance with claim 1 including adjusting the humidity of said second stream of air by adding thereto air from said first stream of air after passing through said adsorption wheel.

15. A system for cooling a stream of air wherein a first stream of air is dehumidified and then cooled in first and second indirect evaporative coolers for purposes of conditioning a second stream of air for introducing to a conditioned space, the system comprised of:

(a) an adsorption body having a multiplicity of passages through which said first stream of air can flow for adsorbing moisture therefrom, the body capable of adsorption of moisture from said first stream of air and of regeneration by passing hot gases therethrough;

(b) a first indirect evaporative cooler and second indirect evaporative cooler, the first indirect evaporative cooler in fluid communication with said adsorption body and said second indirect evaporative cooler in fluid communication with said first indirect evaporative cooler, said first and second indirect evaporative coolers having dry channels and wet channels separated by moisture-impervious walls wherein heat is extracted from said dry channels to said wet channels through said walls by passage of air through said wet channels, said dry channels of said first indirect evaporative cooler in fluid communication with said adsorption body to receive air therefrom, said dry channels capable of cooling said air received from said adsorption body to provide a cooled stream of air having a controlled level of humidity, said first indirect evaporative cooler capable of diverting a portion of said cooled stream air to said wet channels of said first indirect evaporative cooler for purposes of evaporating water in said wet channels thereinto to extract heat from said dry channels of said first indirect evaporative cooler, said second indirect evaporative cooler in fluid communication with said first indirect evaporative cooler to receive a second portion of said cooled stream of air exiting said dry channels of said first indirect evaporative cooler, said second portion directed to the wet channels of said second indirect evaporative cooler for purposes of cooling said dry channels of said second indirect evaporative cooler, said dry channels of said second indirect evaporative cooler adapted to receive a second stream of air comprised of outdoor air, return air from a conditioned space or a mixture thereof and cooling said second stream of air for introducing to the conditioned space; and (c) means for adjusting humidity of said second stream of air prior to cooling in said second indirect evaporative cooler.

16. The system in accordance with claim 15 including an air-to-air heat exchanger adapted to receive and cool air leaving said adsorption wheel prior to said air entering said first indirect evaporative cooler.

17. The system in accordance with claim 15 wherein said means includes adding dry air after passing through said adsorption wheel with said second stream of air.

* * * * *